Feb. 23, 1971    W. E. McCOWN ETAL    3,565,596
APPARATUS FOR CREATING A GAS FILM OVER A CURVED SURFACE
SUPPORTING A GLASS RIBBON
Filed Aug. 30, 1967
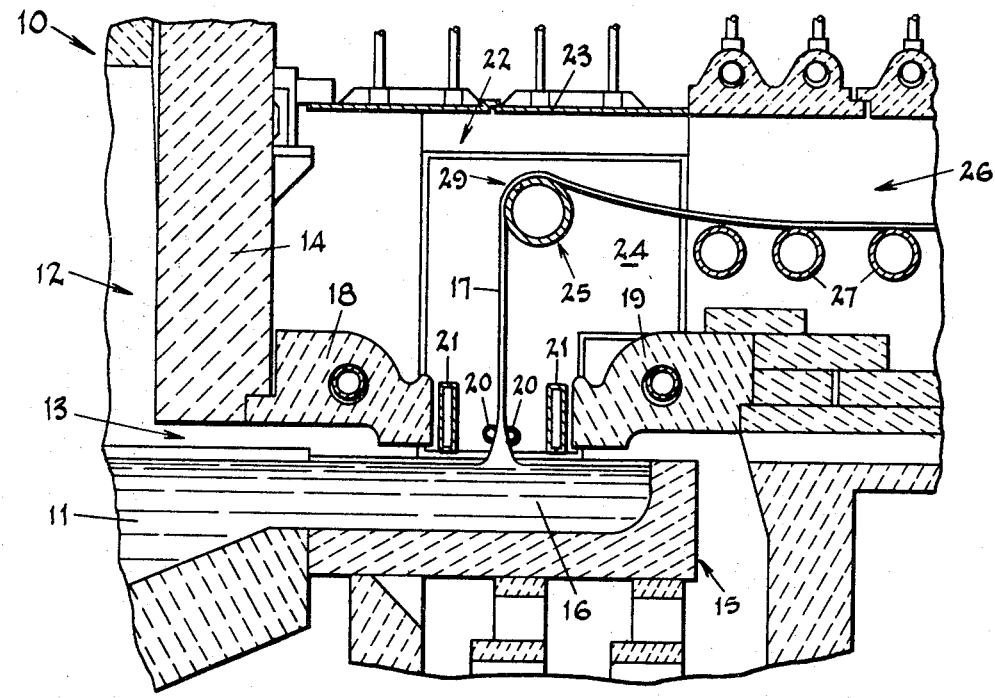
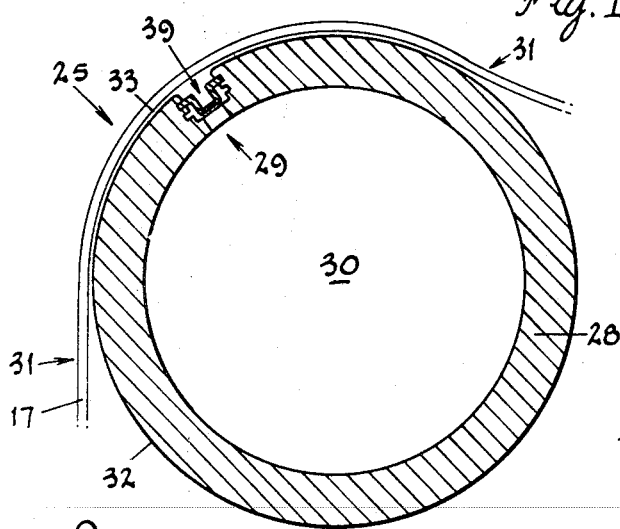
Fig. 1.
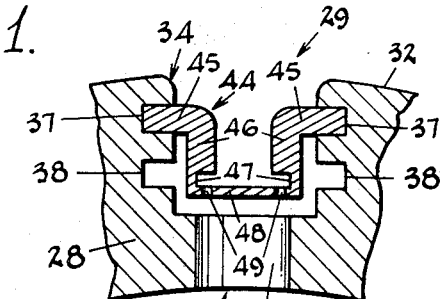
Fig. 4.
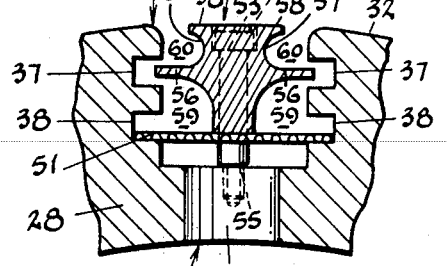
Fig. 5.
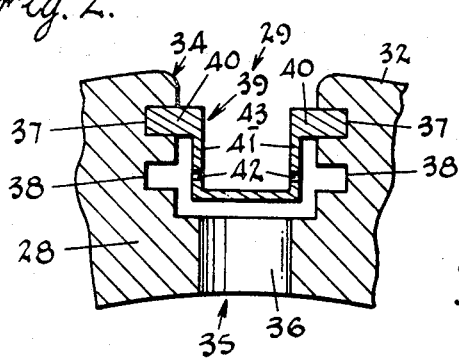
Fig. 2.
Fig. 3.
INVENTORS
William E. McCown and
Eugene H. Heimrich
BY
Collins & Oberlin
ATTORNEYS

United States Patent Office 3,565,596
Patented Feb. 23, 1971

3,565,596
APPARATUS FOR CREATING A GAS FILM OVER A CURVED SURFACE SUPPORTING A GLASS RIBBON
William E. McCown and Eugene H. Heimrich, Toledo, Ohio, assignors to Libbey-Owens-Ford Company, Toledo, Ohio, a corporation of Ohio
Filed Aug. 30, 1967, Ser. No. 664,519
Int. Cl. C03b 15/04
U.S. Cl. 65—182                                7 Claims

ABSTRACT OF THE DISCLOSURE

Preventing formation of lines in the undersurface of a continuous glass ribbon as a film of aeriform fluid is interposed between the undersurface and a stationary supporting surface over which the ribbon is being conveyed while in a highly heated, plastic condition. The aeriform fluid is forced through a slot in the supporting surface extending transversely of the ribbon to form the film, and a mixer is positioned in the slot to prevent impingement of the fluid against the glass in individually defined streams of varying intensity.

BACKGROUND OF THE INVENTION

Field of the invention

The present invention relates broadly to the supporting and conveying of a glass sheet or ribbon while in a highly heated, plastic condition, and more particularly to supporting such a ribbon on a film of aeriform fluid without causing the formation of lines in the lower surface thereof. While the invention is illustrated and described herein with particular regard to the production of window glass in accordance with the Colburn process, for which it is particularly well suited, it will be readily appreciated that it is applicable to the supporting and conveying of plastic sheet material generally such as, for example, in removing the sheet from the molten metal bath in the float process of producing glass.

Description of the prior art

As explained in U.S. Pat. No. 3,137,556, issued June 16, 1964, "window" or "sheet" glass, which is flat drawn glass having fire polished surfaces attained during formation of the sheet, is produced in accordance with one well-known process by drawing a sheet or ribbon upwardly from a mass of molten glass and deflecting it over a so-called bending roll while in a highly heated, plastic condition. A major disadvantage of producing glass in this manner has been the adverse effect which the bending roll may have on the surface quality of the sheet. When the highly heated sheet comes in direct contact with the roll, slight imperfections in the roll surface imprint on the surface of the sheet to cause the undesirable condition in the sheet known in the art as bottom dirt, and the combination of these imperfections with temperature conditions of the roll and surface of the ribbon cause an undesirable condition on the bottom surface of the sheet known as sheen.

In order to avoid this direct contact between the bending roll and sheet and thereby to eliminate the undesirable effects upon the sheet occasioned thereby, it has been proposed to create a film or cushion of aeriform fluid, such as heated air, between the sheet and roll. Thus, the roll remains stationary while the sheet is moved thereover on the film. One manner proposed for forming this film or cushion is to force the aeriform fluid through an elongated slot in the supporting surface beneath the sheet. However, with the slot arrangements used heretofore it has been found that under certain circumstances longitudinally extending lines or streaks may be created in the sheet due to impingement of streams or concentrated areas of fluid upon the lower surface thereof.

SUMMARY OF THE INVENTION

According to the present invention, the sheet or ribbon is carried over a curvilinear surface in which there is formed an elongated slot extending transversely of the ribbon. An aeriform fluid is forced through and around a mixer or diffuser positioned in the slot and having a cross-sectional configuration such that the fluid is distributed as a uniform mass over the curvilinear surface beneath the ribbon to form a supporting film without impinging directly against its undersurface in individual streams of varying intensity.

A primary object of the invention is to support and convey a glass ribbon while in a highly heated, softened condition without creating distortion therein.

Another object of the invention is to create a film of aeriform fluid between such a ribbon and an underlying supporting surface without causing formation of longitudinal streaks or lines in the ribbon.

Still another object of the invention is to avoid impingement of individual streams of aeriform fluid against the undersurface of the ribbon while interposing a film of the fluid between the ribbon and the supporting surface.

Other objects and advantages of the invention will become apparent during the course of the following description, when taken in connection with the accompanying drawings.

BRIEF DESCRIPTION OF THE DRAWINGS

In the drawings, wherein like numerals are employed to designate like parts throughout the same:

FIG. 1 is a longitudinal vertical section through the drawing chamber area of a sheet glass furnace embodying the invention;

FIG. 2 is an enlarged transverse section through a bending member such as is illustrated in FIG. 1;

FIG. 3 is an enlarged fragmentary transverse sectional view of the fluid supply slot portion of the bending member illustrated in FIG. 2;

FIG. 4 is a transverse sectional view of the fluid supply slot showing an alternate embodiment of the mixing or diffusing member therein; and FIG. 5 is a transverse sectional view of the fluid supply slot showing still another embodiment of the mixing or diffusing element therein.

Referring now to the drawings, and particularly to FIG. 1, there is shown generally at 10 the outlet end of the cooling chamber of a continuous tank furnace of any conventional or preferred construction in which a mass of molten glass is continuously produced, refined and cooled to proper working temperature. The molten glass, indicated at 11, flows from a cooling chamber 12 through an opening 13 beneath a cooling chamber end wall 14 into a working receptacle 15 to form a relatively shallow pool 16 of molten glass from which is continuously drawn a sheet or ribbon 17. Front and rear lip-tiles 18 and 19, respectively, located over the molten glass at the entrance end and rear of the working receptacle create a quiescent zone over the molten glass and through which the sheet is drawn upwardly during its formative stage.

Pairs of knurled rolls 20 conventionally engage the sheet along either margin to establish and maintain it at the proper width, and coolers 21 are located opposite either surface in the usual fashion to absorb heat from the sheet by radiation as it is drawn upwardly. The sheet 17 is drawn vertically for a short distance within a drawing chamber, designated generally at 22 and comprising the end wall 14, a roof 23 and opposite side walls 24, and is then deflected about a bending member 25 for passage through an annealing lehr 26 on a series of rolls 27.

Although the sheet 17 is substantially set in its final form at the point where it is deflected about the bending member 25, it is still in a highly heated, softened condition so that contact with the bending member may adversely affect its viewing quality as above-described. In accordance with recent developments in the production of glass by this process, as disclosed in copending application Ser. No. 634,575, of W. E. McCown et al., filed Apr. 28, 1967 and entitled "Producing Sheet Glass," the bending member is provided with a longitudinally extending slot and during normal operation is held stationary with the slot beneath the sheet. An aeriform fluid is forced from the interior of the bending member through the slot to form a film beneath the sheet and upon which the sheet is carried over the bending member and completely out of contact therewith. The portion of the surface of the bending member about which the sheet is deflected may be cylindrical or may have a contoured configuration adapted to maintain a special relationship between the pressure in the fluid film and the radius of curvature of the supporting surface over the area about which the sheet is deflected. In any event, passage of the fluid through the slot in such a manner that it impinges directly against the soft undersurface of the sheet in directed streams in creating the supporting film may have adverse effects upon the sheet as above described. These adverse effects are remarkably reduced if not completely eliminated by the present invention.

The bending member 25 comprises a hollow cylindrical tube 28 mounted at its ends in conventional trunnions (not shown) for rotation about its longitudial axis in the usual fashion for sheet glass bending rolls. The bending member may thus be rotated and operated as a conventional bending roll during starting of the sheet, changing of the roll, or at such other times as operating difficulties may be encountered.

As disclosed in the aforementioned application of William E. McCown et al., there is provided in the wall of the tube 28 an elongated slot, indicated generally at 29, extending longitudinally of the tube and communicating with the interior 30 thereof. During normal operation the bending member is held stationary with the slot positioned beneath the portion of the sheet being deflected thereabout and intermediate the points of tangency 31 where the sheet 17 approaches and departs from the surface 32 of the tubular member. Aeriform fluid is supplied to the hollow interior or supply chamber 30 of the tube under pressure through its ends, this fluid being forced through the slot 29 to form a thin film 33 between the sheet 17 and the surface 32. The fluid is preferably heated in a suitable manner (not shown) prior to introduction into the interior 30 so as to not cause undue cooling of the glass.

A number of devices have been suggested for preventing the fluid from impinging against the sheet in finite directed streams as it flows through the slot. Thus, various combinations of screens and baffles have been employed within the slot to disperse the fluid as it flows therethrough, and have performed very well for this purpose. The present invention, however, constitutes an improvement over such devices.

As best illustrated in FIGS. 2 and 3, the slot 29 is comprised of an upper continuous recess 34 in the surface of the tube 28 and extending throughout its length. At the bottom of the recess a series of elongated openings 35, separated by ribs 36, provide communication between the recess and the interior 30 of the tube. The ribs, which serve to strengthen the tubular member, may be eliminated if unnecessary for this purpose, or if other strengthening means are provided, such as struts extending across the interior 30. The width and depth of the recess 34 and openings 35 may vary for individual bending members.

However, by way of example, when the diameter of the cylindrical tube is in the range from about 14 to 18 inches with a wall thickness of 1 to 1¼ inches, the recess may be on the order of 1 inch in width and ¾ inch in depth to the top of the ribs 36. While the openings 35 have have been shown somewhat narrower than the recess, they may be formed of equal width.

There is provided in the opposite sidewalls of the recess upper and lower pairs of grooves 37 and 38, respectively. A generally U-shaped mixer 39 is mounted in the recess with flanges 40 on its legs 41 received in the upper pair of grooves 37. The flanges are of such dimensions as to fit snugly within the recesses and yet permit relative movement between the mixer and tube 28 due to unequal contraction and expansion. In this connection, the mixer may be secured to the tubular member at one point in its length, such as at one end, so that it can longitudinally expand or contract independently of the tubular member. Of course, the flanges 40 should fit within the grooves 37 with sufficient snugness that the aeriform fluid is not able to escape therebetween and impinge upon the sheet in a concentrated area. For ease of fabrication, the recess 34 and grooves 37 and 38 may extend throughout the length of the tubular member 28. The mixer 39 is then inserted from one end, and the ends of the recess are closed by plugs (not shown) to prevent escape of the fluid at these points.

In the lower portion of each of the legs 41, the mixer is provided throughout its length with a row of spaced perforations 42. Fluid from the hollow interior or supply chamber 30 thus is forced through the perforations in opposed streams into a mixing chamber 43 between the legs of the U-shaped mixer. The opposed streams of fluid are completely dispersed within the mixing chamber, and the fluid is forced out of the recess as a relatively quiescent, continuous, integral mass to form the film 33.

The diameter and spacing of the perforations will depend upon a number of factors such as the pressure within the aeriform fluid in the interior 30 and the thickness of the sheet 17. As disclosed in the aforementioned application of W. E. McCown et al., it is desirable to create a pressure drop as the fluid flows through the slot to form the film 33 so as to damp out pressure fluctuations between the film and the interior 30 of the tubular member. Thus, the diameter of the perforations is such as to create a suitable pressure drop in the fluid passing therethrough. With a pressure in the range from about ½ to ¾ p.s.i. in the interior 30, perforations having a diameter from about 0.06 to 0.10 inch in diameter and spaced about 5/32 inch apart on centers have been found to admit sufficient fluid and give a suitable pressure drop.

In the alternate embodiment of FIG. 4, there is positioned in the slot 29 a generally U-shaped mixer 44 having a somewhat different cross-sectional configuration. Flanges 45 projecting from legs 46 are received in the pair of upper grooves 37. The legs are of considerably greater thickness than those of the previous embodiment, and are notched at 47 where they join the web 48 of the mixer. A row of spaced perforations 49 is located at either edge of the web within the notches 47. Fluid from the hollow interior 30 is thus forced through the perforations against the opposite wall of the notches, and is dispersed thereby into a mixing chamber 50 between the legs 46 from which it emerges as a continuous quiescent mass to form the film 33.

The embodiment of FIG. 5 utilizes a mixer of somewhat different configuration to achieve the desired uniform, quiescent flow. Thus, a screen 51 is positioned in the pair of lower grooves 38. The screen is formed of a material able to withstand prolonged high temperatures such as stainless steel, and has a porosity such that a sufficient pressure drop is created in the fluid passing therethrough. A standard screen porosity of from 250 c.f.m. to 1000 c.f.m. is generally sufficient for this purpose.

A mixer 52 is secured within the recess 34 above the screen by a plurality of setscrews 53 having heads 54 recessed into the top of the mixer. The setscrews have threaded end portions 55 of reduced diameter which are tapped into the ribs 36. The setscrews pass through the screen and, with the mixer and lower walls of the recesses 38, retain the screen in position. From its lower extremity adjacent the screen, the mixer is arcuately curved upwardly and outwardly to form flanges 56 which extend into and are spaced from the walls of the upper recesses 37 so as to preclude a direct path for the fluid from the screen to the undersurface of the sheet. Above the flanges are curved recesses 57 forming secondary flanges 58 at the top of the mixer.

As the fluid is forced through the screen 51 in fine streams, it enters first mixing chambers 59 beneath the flanges 56 at either side of the mixer where it is thoroughly dispersed by the arcuately curved undersurface of the flanges to eliminate any directed individual streams. The dispersed fluid then moves around the flanges through the grooves 37 into second mixing chambers 60, where it is caused to flow outwardly as a uniform continuous mass by the curved recesses 57 and secondary flanges 58 to form the film 33.

It is to be understood that the forms of the invention herein shown and described are to be taken as illustrative embodiments only of the same and that various changes in the size, shape and arrangement of parts, as well as various procedural changes may be resorted to without departing from the spirit of the invention.

We claim:

1. In apparatus for creating a film of aeriform fluid between a glass ribbon and a curved surface about which said ribbon is deflected from a first path into a second path while in a highly heated softened condition, including a supply chamber behind said deflecting surface in which a supply of said fluid is maintained under pressure and an elongated slot in said deflecting surface extending generally transversely of the path of movement of said ribbon thereover and in communication with said supply chamber, the improvement comprising a mixer within said slot having an integral mixing chamber therein in open communication with the undersurface of said ribbon, and means for directing said aeriform fluid into said mixing chamber throughout the length thereof from said supply chamber without impinging against said undersurface, whereby said aeriform fluid is dispersed within said mixing chamber and discharged therefrom as a continuous uniform mass adjacent the undersurface of said ribbon to create said film between said ribbon and said deflecting surface.

2. Apparatus for creating a film of aeriform fluid between a glass ribbon and a deflecting surface as claimed in claim 1, said mixer comprising a member generally U-shaped in cross-section positioned within said slot, the legs and web of said U-shaped member defining said mixing chamber, and said means for admitting said aeriform fluid to said mixing chamber comprising a longitudinally extending row of spaced perforations in at least one of said legs.

3. Apparatus for creating a film of aeriform fluid between a glass ribbon and a deflecting surface as claimed in claim 2, including a longitudinally extending row of spaced perforations in each of said legs, said rows of perforations being oppositely disposed whereby opposed streams of said fluid are directed into said mixing chamber from said supply chamber.

4. Apparatus for creating a film of aeriform fluid between a glass ribbon and a deflecting surface as claimed in claim 3, including pairs of corresponding upper and lower grooves in the opposite side walls of said slot, an outwardly directed flange on each said leg of said mixer, said flanges being received in said upper pair of grooves for mounting said mixer in said slot, and said rows of spaced perforations being positioned adjacent said lower pair of grooves.

5. Apparatus for creating a film of aeriform fluid form fluid between a glass ribbon and a deflecting surface as claimed in claim 1, wherein said mixer comprises a member generally U-shaped in cross-section positioned within said slot, the legs and web of said U-shaped member defining said mixing chamber, an interior recess at the junction of each of said legs with said web, and said means admitting said aeriform fluid to said mixing chamber comprises a longitudinally extending row of spaced perforation means in a wall of said U-shaped mixer for directing streams of fluid from said supply chamber into at least one of said interior recesses within said mixing chamber.

6. Apparatus for creating a film of aeriform fluid between a glass ribbon and a deflecting surface as claimed in claim 5, including a pair of corresponding grooves in the opposite side walls of said slot, an outwardly directed flange on each said leg of said mixer, said flanges being received in said pair of grooves for mounting said mixer in said slot, and two rows of perforations in said web, one of said rows being positioned so as to direct said streams of fluid against an opposite wall of each of said recesses.

7. Apparatus for creating a film of aeriform fluid between a glass ribbon and a deflecting surface as claimed in claim 1, including pairs of corresponding upper and lower grooves in the opposite side walls of said slot, a screen extending across the slot and received in said pair of lower grooves, said mixer being positioned above said screen and having a central body portion curving upwardly and outwardly to form a flange extending into each of said pair of upper grooves, said flanges and screen defining therebetween a first pair of mixing chambers, said flanges being spaced from the walls of said grooves so as to permit passage of said fluid from said mixing chambers therebetween, and a recess in said mixer above each said flange forming a pair of said integral mixing chambers in open communication with the undersurface of said ribbon through which said fluid passes to create said film.

References Cited
UNITED STATES PATENTS

| | | | |
|---|---|---|---|
| 1,547,797 | 7/1925 | Ewing | 65—194 |
| 3,223,498 | 12/1965 | Davidson, Jr. | 65—25 |
| 3,476,539 | 11/1969 | McCown et al. | 65—182 |

ARTHUR D. KELLOGG, Primary Examiner

U.S. Cl. X.R.

65—194, 196